United States Patent
Han et al.

(10) Patent No.: US 9,013,658 B2
(45) Date of Patent: Apr. 21, 2015

(54) METHOD OF MANUFACTURING REFLECTIVE COLOR FILTER

(75) Inventors: Moon Gyu Han, Yongin-si (KR); Yong-wan Jin, Seoul (KR); Hong-seok Lee, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 597 days.

(21) Appl. No.: 12/923,779

(22) Filed: Oct. 7, 2010

(65) Prior Publication Data

US 2011/0108779 A1 May 12, 2011

(30) Foreign Application Priority Data

Nov. 9, 2009 (KR) .................. 10-2009-0107521

(51) Int. Cl.
| | |
|---|---|
| G02F 1/095 | (2006.01) |
| G02F 1/1335 | (2006.01) |
| B82Y 20/00 | (2011.01) |
| G02B 1/00 | (2006.01) |
| G02B 5/20 | (2006.01) |
| G02B 5/26 | (2006.01) |
| G02B 5/28 | (2006.01) |

(52) U.S. Cl.
CPC ............... G02B 1/005 (2013.01); G02B 5/201 (2013.01); G02B 5/26 (2013.01); G02B 5/28 (2013.01); *G02F 1/133516* (2013.01); *G02F 2202/022* (2013.01); *G02F 2202/32* (2013.01); *G02F 2202/36* (2013.01); *Y10S 977/901* (2013.01); *Y10S 977/932* (2013.01)

(58) Field of Classification Search
CPC .................. B82Y 20/00; B82Y 30/00
USPC .......... 252/500–600; 349/100–113; 977/901, 977/932
See application file for complete search history.

(56) References Cited

U.S. PATENT DOCUMENTS

| | | | | |
|---|---|---|---|---|
| 5,281,370 | A * | 1/1994 | Asher et al. | 264/1.1 |
| 7,145,614 | B2 * | 12/2006 | Lee et al. | 349/106 |
| 7,450,196 | B2 * | 11/2008 | Lee et al. | 349/106 |
| 7,929,080 | B2 * | 4/2011 | Lee et al. | 349/106 |
| 2002/0008229 | A1 * | 1/2002 | Asher et al. | 252/600 |
| 2002/0173610 | A1 * | 11/2002 | Aert et al. | 526/303.1 |
| 2003/0122112 | A1 * | 7/2003 | Foulger et al. | 252/582 |
| 2003/0218704 | A1 * | 11/2003 | Lee et al. | 349/106 |
| 2004/0131799 | A1 * | 7/2004 | Arsenault et al. | 428/1.26 |
| 2005/0126470 | A1 * | 6/2005 | Herman et al. | 117/2 |
| 2005/0275334 | A1 * | 12/2005 | Park et al. | 313/495 |
| 2006/0002150 | A1 * | 1/2006 | Kim | 362/627 |

(Continued)

OTHER PUBLICATIONS

Reese et al. ("Synthesis of Highly Charged, Monodisperse Polystyrene Colloidal Particles for the Fabrication of Photonic Crystals." J. Colloid and Interface Sc., 232, pp. 76-80, 2000).*

(Continued)

*Primary Examiner* — Tri V Nguyen
(74) *Attorney, Agent, or Firm* — Harness, Dickey & Pierce, PLC

(57) ABSTRACT

Provided is a method of manufacturing a reflective color filter. According to the method, the reflective color filter may reflect light having a desired wavelength by controlling the distance between colloidal particles. The method of manufacturing a reflective color filter may include forming colloidal particles having a charged surface, forming colloidal crystals by controlling distances between the colloidal particles, and forming a photonic crystal composite by fixing the colloidal crystals having the colloidal particles.

16 Claims, 14 Drawing Sheets

(56) References Cited

U.S. PATENT DOCUMENTS

| | | | |
|---|---|---|---|
| 2007/0159579 A1* | 7/2007 | Lee et al. | 349/113 |
| 2008/0108730 A1* | 5/2008 | Ben-Moshe et al. | 523/171 |
| 2008/0309857 A1* | 12/2008 | Lee et al. | 349/106 |
| 2009/0291228 A1* | 11/2009 | Cho et al. | 427/535 |

OTHER PUBLICATIONS

Sumida et al. ("Electrochemical Change of the Photonic Stop Band of the Ordered Macroporous WO3 Films." Chemistry Letters, pp. 180-181, 2002).*

* cited by examiner

METHOD OF MANUFACTURING REFLECTIVE COLOR FILTER

CROSS-REFERENCE TO RELATED APPLICATIONS

This application claims priority under 35 U.S.C. §119 to Korean Patent Application No. 10-2009-0107521, filed on Nov. 9, 2009, in the Korean Intellectual Property Office (KIPO), the entire contents of which are herein incorporated by reference.

BACKGROUND

1. Field

Example embodiments relate to a method of manufacturing a reflective color filter, and more particularly, to a method of manufacturing a reflective color filter capable of reflecting light having a desired wavelength by controlling a lattice constant of a photonic crystal structure using a photonic crystal composite.

2. Description of the Related Art

By using ambient lights to brighten images on a screen, reflective displays have relatively high energy efficiency, relatively low power consumption, and relatively excellent legibility.

Photonic crystals have a lattice structure in which at least two materials with different refractive indices are regularly arranged two-dimensionally or three-dimensionally. Such a photonic crystal having the lattice structure has a photonic bandgap that may block or pass light with a certain wavelength due to periodic distribution of refractive indices.

For example, if the photonic bandgap of the photonic crystal is formed in a visible light region, and a frequency of light that is incident upon the photonic crystal corresponds to the photonic bandgap, theoretically, incident light is reflected by the photonic crystal by 99% or more. On the other hand, most of incident light having a frequency that is not within the photonic bandgap passes through the photonic crystal. Such three-dimensional reflective characteristics may be applied to a reflective color filter of a display. For this, R, G, and B pixels are required to have different photonic bandgaps.

The three-dimensional photonic crystals may be manufactured using a top-down method using lithography that is commonly used in the art and a self-assembly method using physical or chemical combinations of colloidal particles or polymers. The self-assembly (bottom-up) method is a relatively inexpensive and relatively easy process when compared with the top-down method. Vertical deposition by which colloidal particles are densely formed using evaporation of a solvent and a capillary force by vertically disposing a substrate, for example, glass in a colloidal solution having an appropriate particle size, natural gravity sedimentation, centrifugation, electrophoretic deposition, and solvent evaporation are generally used as the self-assembly method.

Theses methods still take a relatively long time and micro colloidal particles are relatively difficult to be controlled using them, and thus various processes are required to control the photonic bandgap of each region by patterning the photonic crystal structure. For example, each portion of the photonic crystals needs to be manufactured separately using colloidal particles having different sizes or reflective indices in order to control the photonic bandgap. In order to prepare different colloidal particles, templates need to be formed and removed each time. Repeatedly forming and removing templates may influence the previously formed crystal structure.

Also, forming different photonic crystal structures using at least two colloidal particles by repeating the process is limited and relatively complicated.

SUMMARY

Provided is a method of manufacturing a reflective color filter that may be capable of reflecting light having a desired wavelength by controlling the distance between colloidal particles.

Example embodiments will be set forth in part in the description which follows and, in part, will be apparent from the description, or may be learned by practice of example embodiments.

In accordance with example embodiments, a method of manufacturing a reflective color filter may include forming colloidal particles having a charged surface, forming colloidal crystals by controlling distances between the colloidal particles, and forming a photonic crystal composite by fixing the colloidal crystals having the colloidal particles.

In accordance with example embodiments, a method of manufacturing a reflective color filter may include forming colloidal particles having a charged surface, forming colloidal crystals by controlling the distance between the colloidal particles, and forming a photonic crystal composite by fixing the colloidal particles having colloidal crystals.

The colloidal particles may be formed by adding a persulfate initiator to a monomer.

The monomer may include an acrylate-based or methacrylate-based monomer selected from the group consisting of methyl methacrylate, ethyl methacrylate, butyl methacrylate, and hydroxyethyl methacrylate, an aromatic monomer selected from the group consisting of vinyl benzene, vinyl toluene, and styrene, an acrylamide monomer selected from the group consisting of acrylamide, N-isopropyl acrylamide, hydroxyethyl acrylamide, and isobutylmethyl acrylamide, or any composite thereof.

The persulfate initiator may be ammonium persulfate $((NH_4)_2S_2O_8)$, potassium persulfate $(K_2S_2O_8)$, or sodium persulfate $(Na_2S_2O_8)$.

A surfactant may be further added to the monomer.

The surfactant may be an anionic surfactant, a cationic surfactant, or a zwitterionic surfactant.

The colloidal crystals may be formed in a face-centered cubic (FCC) structure, a body-centered cubic (BCC) structure, or a hexagonal close-packed (HCP) structure.

The photonic crystal composite may be formed by adding a monomer mixture that photo-polymerizes the colloidal crystals to the colloidal crystals and photo-polymerizing the mixture.

The monomer mixture may include monomers for photo-polymerization, a photo initiator, and a cross-linking agent.

The monomer for photo-polymerization may be an acrylamide-based monomer or an acrylate-based monomer.

The acrylate-based monomer may be ethylene glycol methacrylate, poly(ethylene glycol) methacrylate, hydroxyethyl methacrylate, or butyl methacrylate.

The cross-linking agent may be N,N'-methylenebisacrylamide, methylenebismethacrylate, ethyleneglycol dimethacrylate, or poly(ethyleneglycol dimethacrylate).

The photo initiator may be 2-hydroxy-2-methylpropiophenone, 2,2-dimethoxy-2-phenylacetophenone, or 2,2-diethoxyacetophenone.

The distance between the colloidal particles may be controlled by introducing a monomer into the photonic crystal composite, expanding the colloidal particles by adding a solvent, or contracting the colloidal particles by evaporating the solvent.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1A:
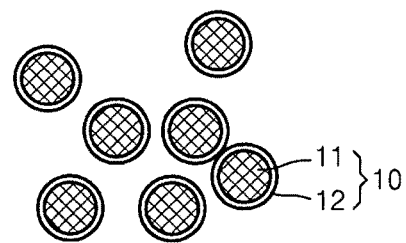
FIGS. 1A to 1C illustrate colloidal particles having a charged surface and the arrangement of the colloidal particles.

Example embodiments will now be described more fully with reference to the accompanying drawings. Embodiments, however, may be embodied in many different forms and should not be construed as being limited to the embodiments set forth herein. Rather, example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components that may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made with reference to example embodiments which are illustrated in the accompanying drawings, wherein like reference numerals refer to the like elements throughout, and the thickness of layers and regions is exaggerated for clarity. In this regard, example embodiments may have different forms and should not be construed as being limited to the descriptions set forth herein. Accordingly, example embodiments are described below, by referring to the figures, to illustrate and explain aspects of the present description.

A method of manufacturing a reflective color filter, according to example embodiments may include forming colloidal particles having a charged surface, forming colloidal crystals by controlling the distance between the colloidal particles, and forming a photonic crystal composite capable of reflecting light having a certain wavelength by fixing the colloidal crystal structure.

Colloidal particles having a charged surface may be prepared by adding a persulfate initiator to a monomer, and a surfactant may further be added thereto. The monomer may be an acrylate-based or a methacrylate-based monomer (for example, methyl methacrylate, ethyl methacrylate, butyl methacrylate, and hydroxyethyl methacrylate), an aromatic monomer (for example, vinyl benzene, vinyl toluene, and styrene), an acrylamide monomer (for example, acrylamide, N-isopropyl acrylamide, hydroxyethyl acrylamide, and isobutylmethyl acrylamide), or any composite or copolymer thereof. The persulfate initiator may be ammonium persulfate (($NH_4$)$_2S_2O_8$), potassium persulfate, ($K_2S_2O_8$) or sodium persulfate ($Na_2S_2O_8$). The surfactant may be an anionic surfactant such as sodium dodecyl sulfate (SDS), a cationic surfactant, or a zwitterionic surfactant.

The method will now be described in more detail below. Water, for example deionized water (D.I. water), may be added to a flask. A surfactant may be added thereto, and the flask may be stirred. A monomer may be added thereto and the mixture may be stirred for a time period which may or may not be predetermined. An initiator may be added to the mixture at a temperature which may or may not be predetermined and the mixture may be maintained for reaction for a time period which may or may not be predetermined. As a non-limiting example of the aforementioned operations, 120 ml of deionized water (D. I. water) may be added to a flask, 1.0 g of sodium dodecyl sulfate (SDS) as a surfactant may be added thereto, and the flask may be stirred. About 25 ml of a methyl methacrylate monomer may be added thereto, and the mixture may be stirred for about 20 minutes. About 0.0635 g of potassium persulfate ($K_2S_2O_8$) that is dissolved in 10 ml of water, as an initiator, may be added thereto at about 80☐, and the mixture may be maintained for reaction for about 5 hours.

Figure 1B:
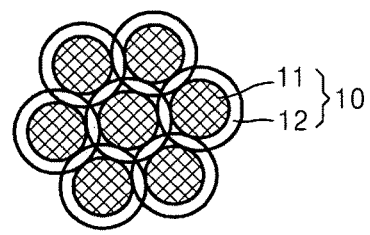
Figure 1C:
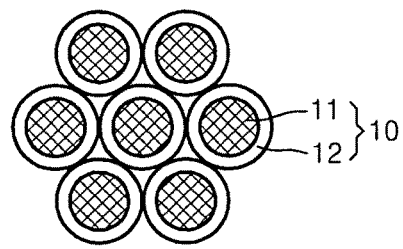

According to the process described above, colloidal particles having a charged surface may be prepared. Referring to FIG. 1A, a colloidal particle 10 in a colloidal solution may have a particle body 11 and a charged area 12. The colloidal particles 10 may be disorderedly dispersed in the initial stage of the formation of the colloidal particles. An aqueous solution in which the colloidal particles 10 are disorderedly dispersed may have a milky white color. If a small amount of unreacted monomers or surfactants contained in the colloidal solution are removed by dialysis with D.I. water, adding a monomer thereto, or treating with an ion-exchange resin, the colloidal particles 10 may form colloidal crystals having a face-centered cubic (FCC) structure, a body-centered cubic (BCC) structure, or a hexagonal close-packed (HCP) structure in a long range self assembly due to a repulsion force between charges of the surface of the colloidal particles 10. If external light is applied to the three-dimensional crystalline structure, the light may be reflected by constructive interference due to the periodicity of the structure. Based on this principle, the distance between the colloidal particles may be controlled by adjusting the concentration of the colloidal particles contained in the colloidal solution, as shown in FIGS. 1B and 1C, and thus reflective light having a desired wavelength may be obtained.

Figure 2A:
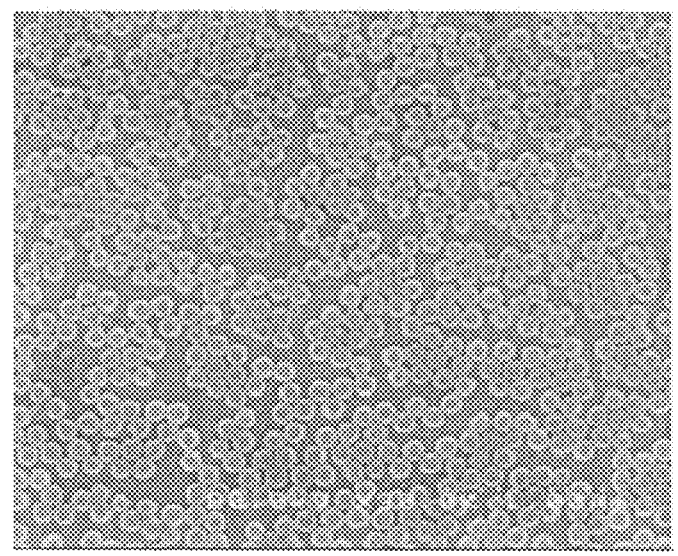
FIG. 2A is a scanning electron microscopic (SEM) image of colloidal particles that are formed.
Figure 2B:
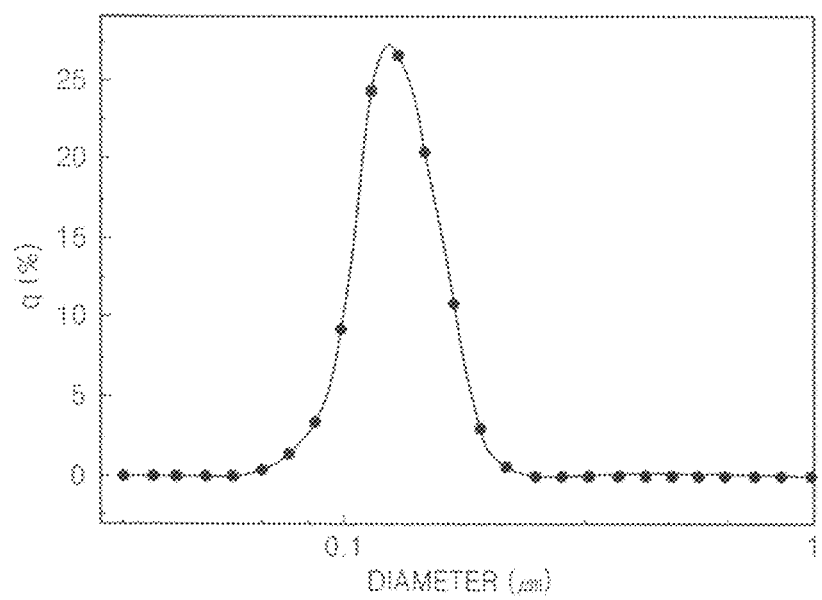
FIG. 2B is a graph illustrating the particle size distribution of the colloidal particles.

FIG. 2A is a scanning electron microscopic (SEM) image of colloidal particles that are formed. FIG. 2B is a graph illustrating the particle size distribution of the colloidal particles. The particle size (diameter) of the colloidal particles may be adjusted within a range of about 30 to about 600 nm, and the dispersibility of the particle size may be about 5% or less so that the colloidal particles have a relatively uniform size.

Figure 3A:
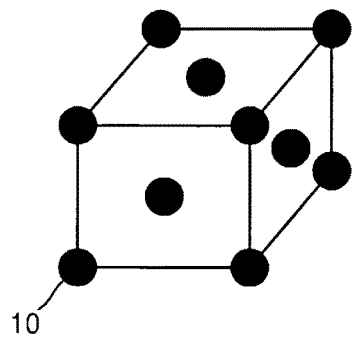
FIGS. 3A to 3C are schematic diagrams illustrating a method of forming a photonic crystal composite by fixing the arrangement of the colloidal particles.
Figure 3B:
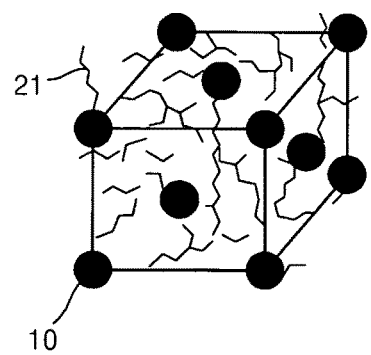
Figure 3C:
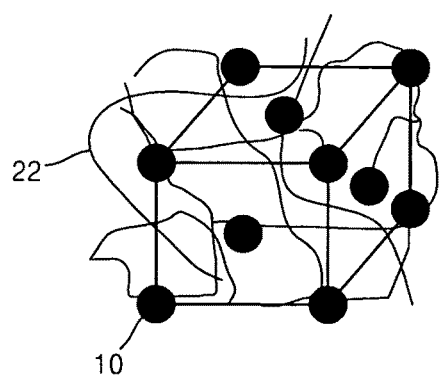

FIGS. 3A to 3C are schematic diagrams illustrating a process of forming photonic crystals using colloidal crystals having colloidal particles that are arranged to have an adjusted distance for reflecting light with a certain wavelength as described above.

FIG. 3A illustrates colloidal crystals having colloidal particles 10 that are arranged to have an adjusted distance therebetween in a colloidal solution. Since the distance between the colloidal particles 10 may be changed in the structure shown in FIG. 3A, a process of fixing the positions of the colloidal particles 10 to form a robust photonic crystal composite is conducted.

For this, referring to FIG. 3B, a monomer mixture for photo-polymerization of the colloidal crystals, e.g., monomers 21 for photo-polymerization, a photo initiator, and a cross-linking agent may be added to the colloidal crystals to obtain an ordered state. As shown in FIG. 3C, the colloidal crystals may be exposed to ultraviolet (UV) rays to form a photonic crystal composite which includes a polymer 22 formed by the photo-polymerization operation.

Monomers or oligomers for photo-polymerization which may be contained in the monomer mixture may be an acrylamide (for example, ispropylacrylamide), or an acrylate (for example, ethylene glycol methacrylate, poly(ethylene glycol) methacrylate, hydroxyethyl methacrylate, and butyl methacrylate). The cross-linking agent may be N,N'-methylenebisacrylamide, methylenebismethacrylate, ethyleneglycol dimethacrylate, or poly(ethyleneglycol dimethacrylate). The photo initiator may be 2-hydroxy-2-methylpropiophenone, 2,2-dimethoxy-2-phenylacetophenone, or 2,2-diethoxyacetophenone.

Thus, the formed photonic crystal composite may stably reflect light having a certain wavelength since the distance between the colloidal particles may be fixed. Even though the colloidal particles in the photonic crystal composite may have a constant distance therebetween, the distance between the colloidal particles may be controlled by introducing a monomer into the photonic crystal composite, expanding the colloidal particles by adding a solvent, or contracting the colloidal particles by evaporating the solvent. Pixels respectively including a photonic crystal composite corresponding to each color, for example, red (R), green (G), and blue (B) colors, may be prepared according to the process described above to prepare a reflective color filter.

Figure 4A:
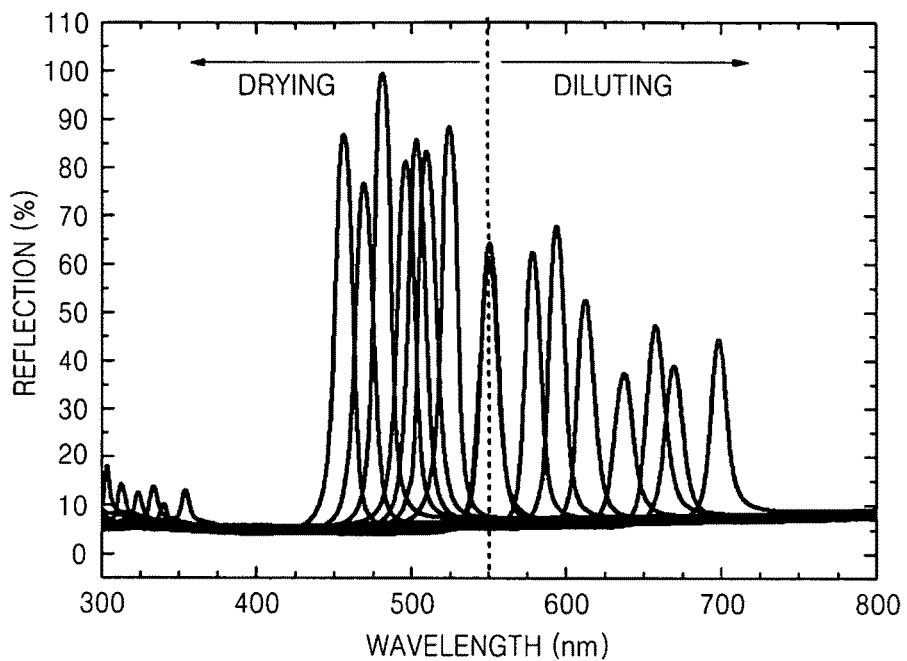
FIG. 4A is a graph illustrating optical spectra when the distance between the colloidal particles is changed to control a reflective color in a visible ray region.

FIG. 4A is a graph illustrating optical spectra when the distance between the colloidal particles is changed by controlling the density by adding water to the colloidal crystals or evaporating water. Reflective colors of the entire range of the visible rays may be realized by changing the distance between the colloidal particles.

Figure 4B:
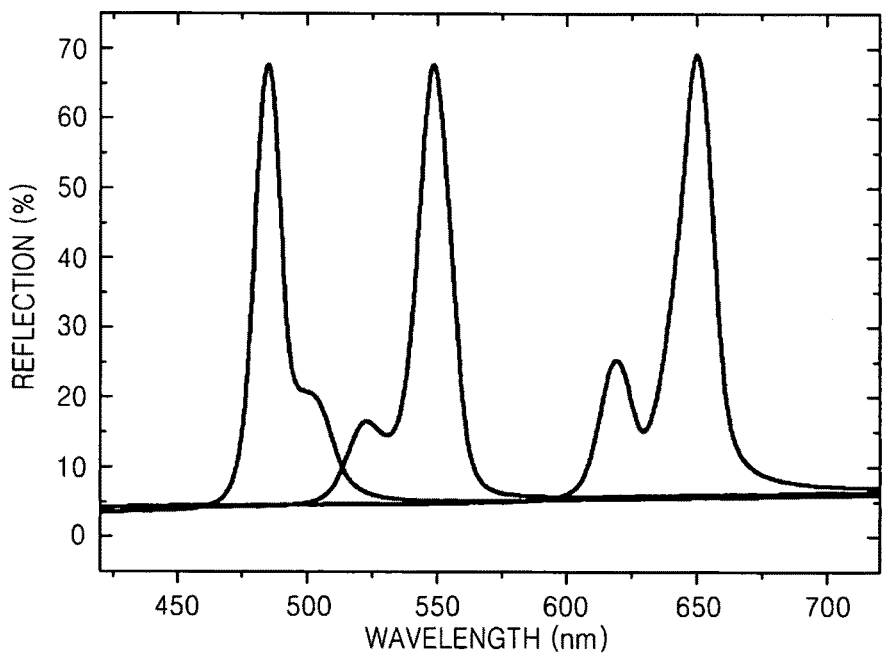
FIG. 4B is a graph illustrating optical spectra of a photonic crystal composite formed of colloidal crystals respectively corresponding to red (R), green (G), and blue (B) colors by controlling the distance between the colloidal particles.

FIG. 4B is a graph illustrating optical spectra of photonic crystal composites formed of colloidal crystals respectively corresponding to red (R), green (G), and blue (B) colors. Referring to FIG. 4B, reflective lights that have almost the same reflectivity and correspond to RGB may stably be realized by controlling the distance between the colloidal particles.

FIGS. 5A to 5F are schematic diagrams illustrating a method of manufacturing a color filter, according to example embodiments.

Figure 5A:
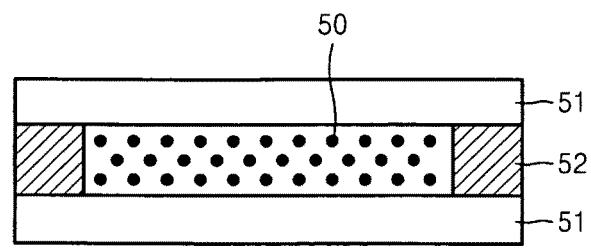
FIGS. 5A to 5F are schematic diagrams illustrating a method of manufacturing a reflective color filter, according to example embodiments.
Figure 5B:
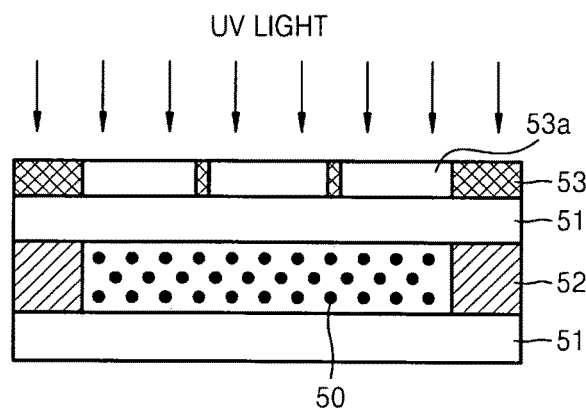
Figure 5C:
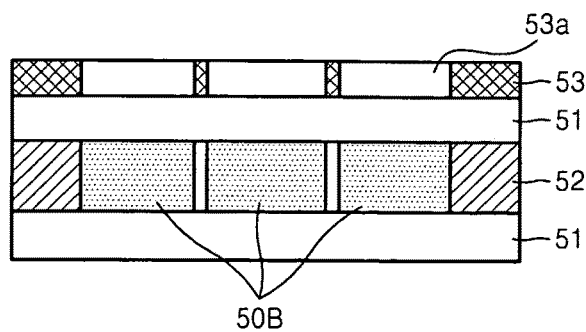

Referring to FIG. 5A, colloidal crystals capable of reflecting blue color and a monomer mixture 50 for photo-polymerization may be injected into a region that is formed by glasses 51 and spacers 52. Referring to FIG. 5B, a mask 53 having a mask pattern 53a with three openings may be disposed on the glass 51 and UV rays may be irradiated thereto. Accordingly, as shown in FIG. 5C, colloidal crystals and the monomer mixture 50 for photo-polymerization in the region to which the UV rays are irradiated form photonic crystals 50B that reflect blue color.

Figure 5D:
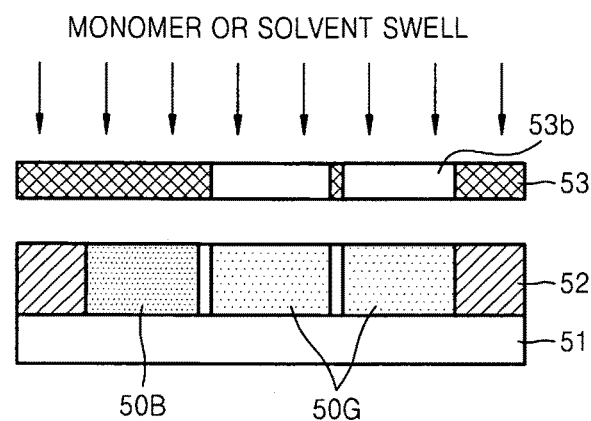
Figure 5E:
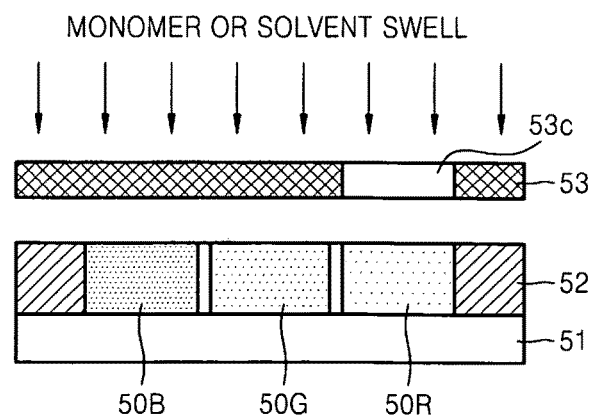
Figure 5F:
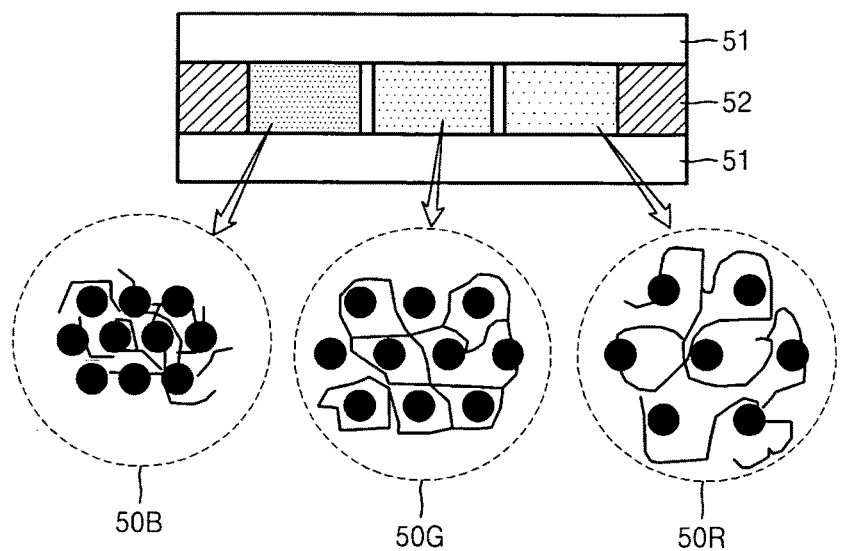

Referring to FIG. 5D, the upper glass 51 may be removed and a mask 53 having a mask pattern 53b with two openings may be disposed thereon, and a monomer or solvent may be injected into the photonic crystal composite through the mask pattern 53b to change the photonic crystals 50B to a photonic crystal composite 50G capable of reflecting green color. A process of injecting a polymer for UV polymerization into the photonic crystal composite and irradiating UV rays may further be conducted. Referring to FIG. 5E, a mask pattern 53c with one opening may be disposed on the spacer 52, and a monomer or solvent may be injected into the photonic crystal composite 50G to change one photonic crystal composite 50G to a photonic crystal composite 50R capable of reflecting red color. A process of injecting a polymer for UV polymerization into the photonic crystal composite and irradiating UV rays may further be conducted. Referring to FIG. 5F, the upper portion may be sealed with the glass 51 to form a color filter including pixels having photonic crystal composites 50B, 50G, and 50R which may respectively reflect blue, green, and red colors.

FIGS. 6A to 6F are schematic diagrams illustrating a method of manufacturing a color filter, according to example embodiments.

Figure 6A:
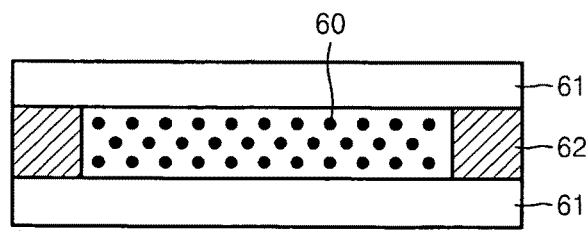
FIGS. 6A to 6F are schematic diagrams illustrating a method of manufacturing a reflective color filter, according to example embodiments.
Figure 6B:
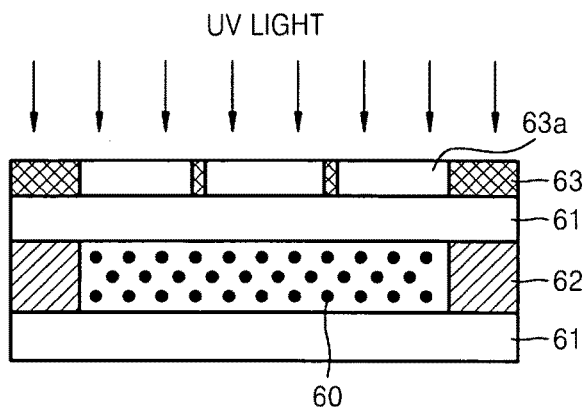
Figure 6C:
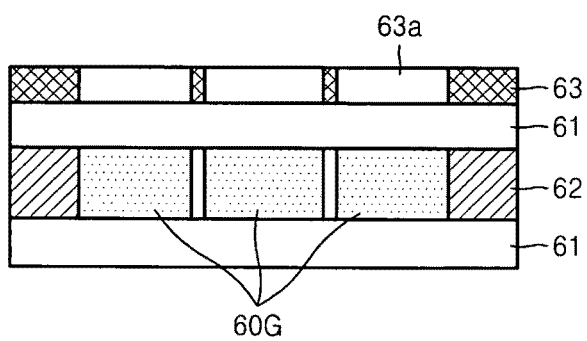
Figure 6D:
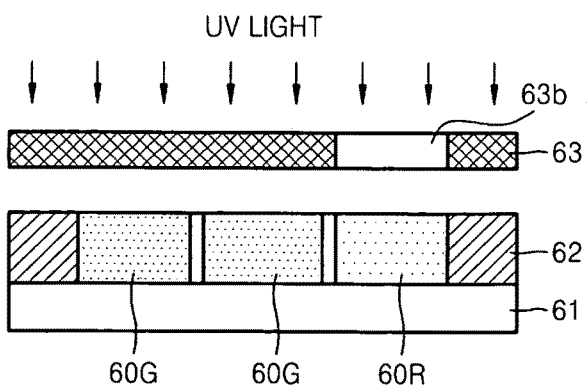

Referring to FIG. 6A, colloidal crystals capable of reflecting green color and a monomer mixture 60 for photo-polymerization may be injected into a region that is formed by glasses 61 and spacers 62. Referring to FIG. 6B, a mask 63 having a mask pattern 63a with three openings may be disposed on the glass 61 and UV rays may be irradiated thereto. Accordingly, as shown in FIG. 6C, the colloidal crystals and the monomer mixture 60 in the region to which the UV rays are irradiated may form photonic crystals 60G that reflect green color. Referring to FIG. 6D, the upper glass 61 may be removed, a mask 63 having a mask pattern 63b with one opening may be disposed thereon, and a monomer or a solvent may be injected into the photonic crystal composites through the mask pattern 63b to change the photonic crystals 60G to a photonic crystal composite 60R capable of reflecting red color. A process of applying UV light, as shown in FIG. 6D, may be conducted to fix the structure.

Figure 6E:
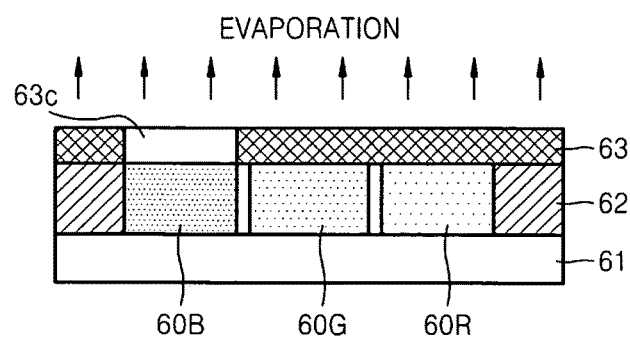
Figure 6F:
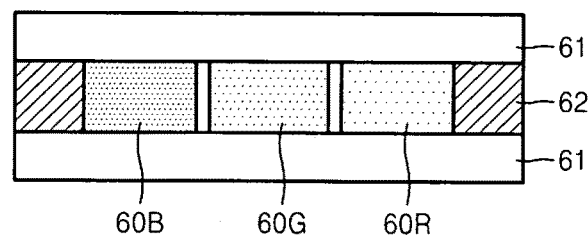

Referring to FIG. 6E, a mask 63 having a mask pattern 63c to open one of the photonic crystal composites 60G may be disposed thereon, and the photonic crystal composite 60G region may be evaporated through the mask pattern 63c to form a photonic crystal composite 60B capable of reflecting blue color. Referring to FIG. 6F, the upper portion of the spacers 62 may be sealed with the glass 61 to form a color filter including pixels having photonic crystal composites 60B, 60G, and 60R which may respectively reflect blue, green, and red colors.

FIGS. 7A to 7F are schematic diagrams illustrating a method of manufacturing a color filter, according to example embodiments.

Figure 7A:
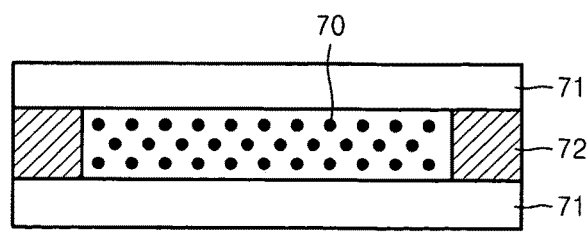
FIGS. 7A to 7F are schematic diagrams illustrating a method of manufacturing a reflective color filter, according to example embodiments.
Figure 7B:
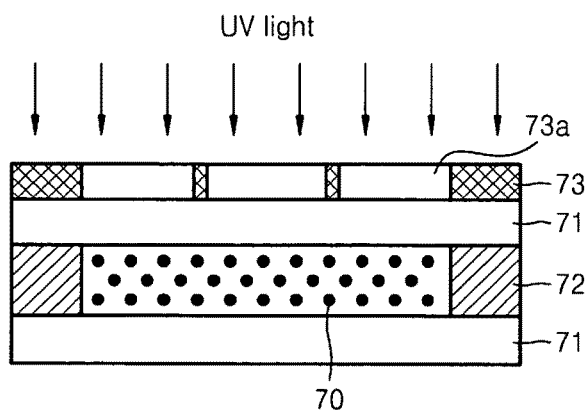
Figure 7C:
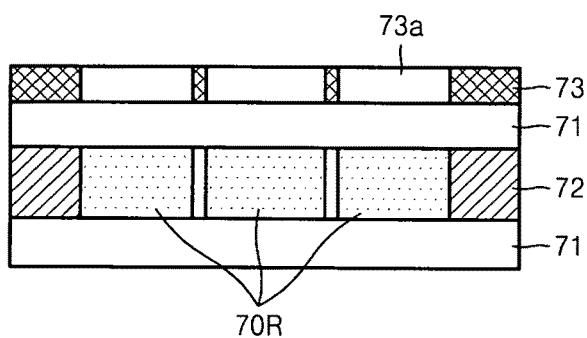
Figure 7D:
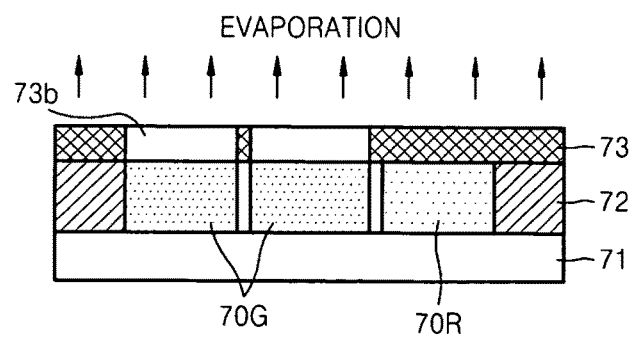

Referring to FIG. 7A, colloidal crystals capable of reflecting red color and a monomer mixture 70 for photo-polymerization may be injected into a region that is formed by glasses 71 and spacers 72. Referring to FIG. 7B, a mask 73 having a mask pattern 73a with three openings may be disposed on the glass 71 and UV rays may be irradiated thereto. Accordingly, as shown in FIG. 7C, colloidal crystals and the monomer mixture 70 in the region to which the UV rays may be irradiated form photonic crystals 70R that may reflect red color. Referring to FIG. 7D, the upper glass 71 may be removed, a mask 73 having a mask pattern 73b with two openings may be disposed thereon, and an evaporation process may be conducted through the mask pattern 73c to change the photonic crystal composite 70R to a photonic crystal composite 70G capable of reflecting green color.

Figure 7E:
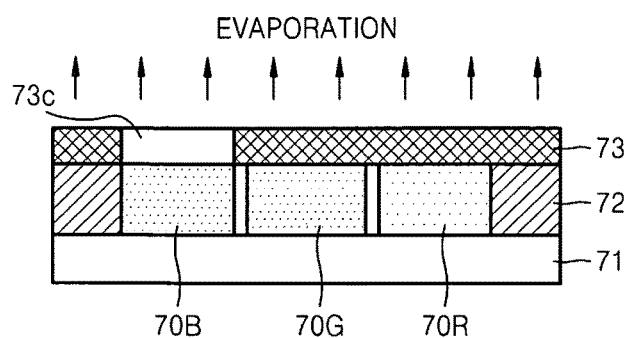
Figure 7F:
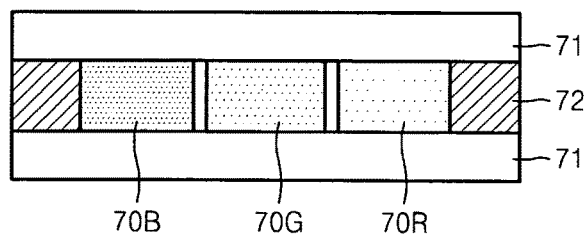

Referring to FIG. 7E, a mask 73 having a mask pattern 73c to open one of the photonic crystal composites 70G may be disposed, and one of the photonic crystal composite 70G regions may be evaporated through the mask pattern 73c to form a photonic crystal composite 70B capable of reflecting blue color. Referring to FIG. 7F, the upper portion of the spacers 72 may be sealed with the glass 71 to form a color filter including pixels having photonic crystal composites 70B, 70G, and 70R which respectively reflect blue, green, and red colors.

FIGS. 8A to 8F are schematic diagrams illustrating a method of manufacturing a color filter, according to example embodiments.

Figure 8A:
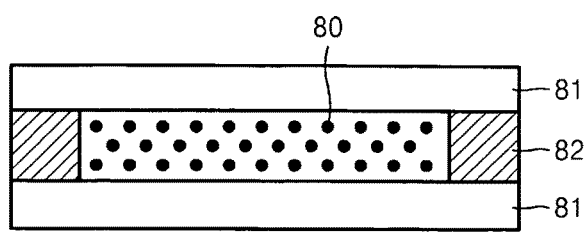
FIGS. 8A to 8F are schematic diagrams illustrating a method of manufacturing a reflective color filter, according to example embodiments.
Figure 8B:
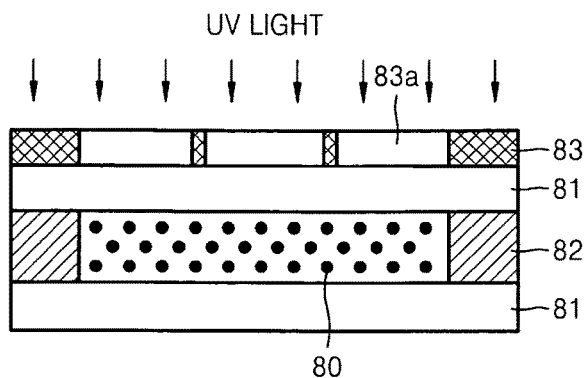
Figure 8C:
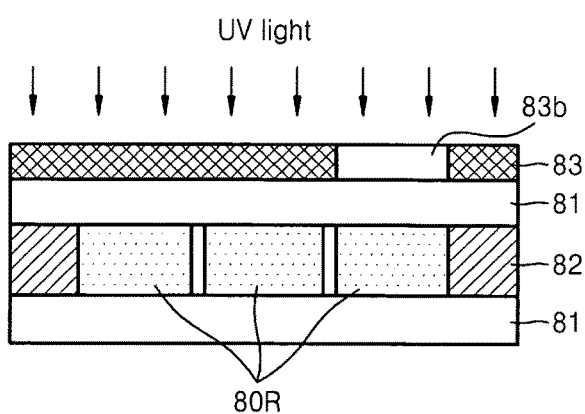
Figure 8D:
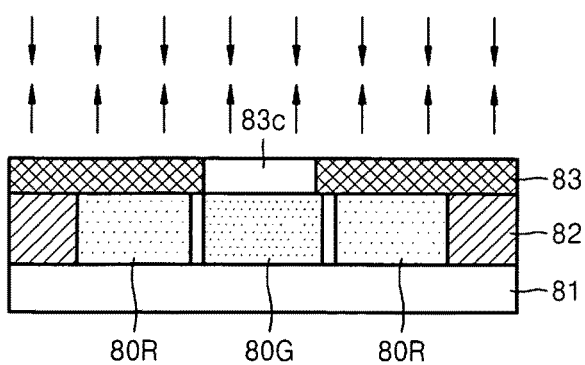

Referring to FIG. 8A, colloidal crystals capable of reflecting red color and a monomer mixture 80 for photo-polymerization may be injected into a region that is formed by glasses 81 and spacers 82. Referring to FIG. 8B, a mask 83 having a mask pattern 83a with three openings may be disposed on the glass 81 and UV rays may be irradiated thereto. Referring to FIG. 8C, the colloidal crystals and the monomer mixture 80 may form three photonic crystal composites 80R capable of reflecting red color by the UV-ray irradiation. A mask 83 having a mask pattern 83b to open one of the photonic crystal composites 80R may be disposed, and the UV rays may be irradiated thereto again to stabilize the photonic crystal composite 80R. Referring to FIG. 8D, the upper glass 81 may be removed, a mask 83 having a mask pattern 83c to open one of the photonic crystal composites 80R that is not open by the mask pattern 83a shown in FIG. 8C may be disposed, and the region may be evaporated using the mask pattern 83c to change the photonic crystal composite 80R to a photonic crystal composite 80G capable of reflecting green color. UV rays may be irradiated thereto to fix the structure.

Figure 8E:
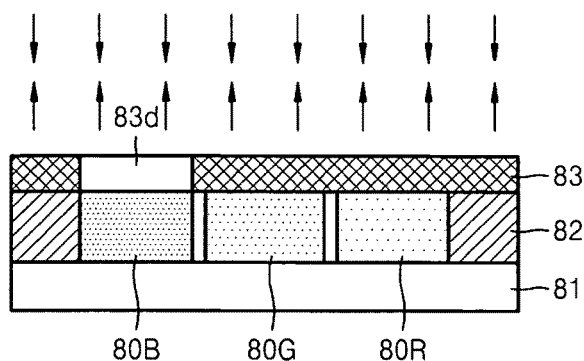
Figure 8F:
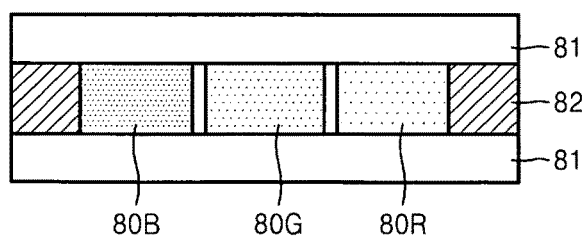

Referring to FIG. 8E, a mask 83 having a mask pattern 83d to open the other photonic crystal composition 80R that is not open by the mask pattern 83b of FIG. 8C may be disposed, and an evaporation may be conducted to form a photonic crystal composite 80B capable of reflecting blue color. UV rays may be irradiated thereto to fix the structure. Referring to FIG. 8F, the upper portion of the spacers 82 may be sealed with the glass 81 to form a color filter including pixels having photonic crystal composites 80B, 80G, and 80R which respectively reflect blue, green, and red colors.

Figure 9A:
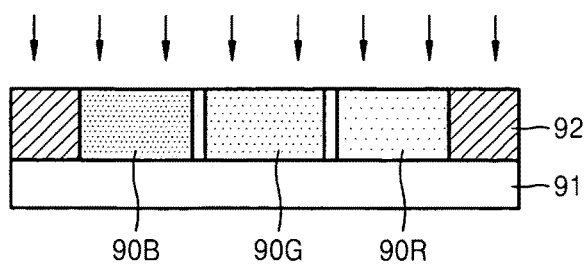
FIGS. 9A to 9C are schematic diagrams illustrating a method of manufacturing a color filter, according to example embodiments.
Figure 9B:
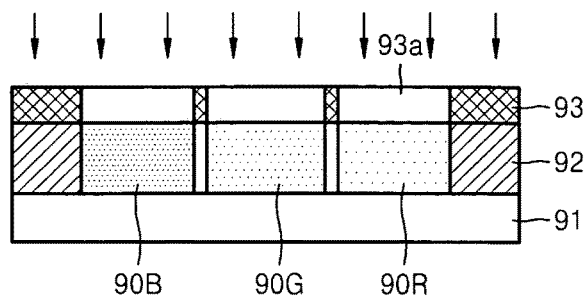
Figure 9C:
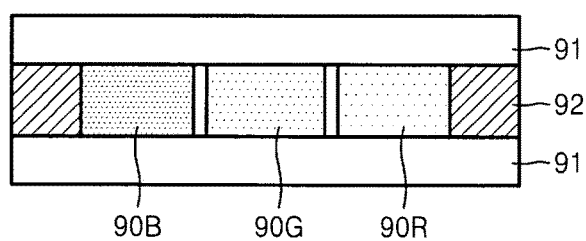

FIGS. 9A to 9C are schematic diagrams illustrating a method of manufacturing a color filter, according to example embodiments.

Referring to FIG. 9A, colloidal crystals corresponding to photonic crystal composites 90B, 90G, and 90R and a monomer mixture for photo-polymerization may be respectively injected into a region that is formed with glass 91 and spacers 92, e.g., pixels. As shown in FIG. 9B, a mask 93 having three mask patterns 93a may be disposed thereon, and UV rays may be irradiated thereto to fix the structure to form pixels including photonic crystal composites 90B, 90G, and 90R. Referring to FIG. 9C, the mask 93 may be removed, and the upper portion may be sealed with the glass 91. In this regard, the photo-polymerizable photonic crystal mixture may be injected into the pixels using inkjet printing, screen printing, roll-to-roll printing, and transfer printing.

As described above, according to example embodiments, a reflective color filter may be efficiently manufactured using a simple process of forming photonic crystal composites capable of reflecting light having a desired wavelength by controlling the distance between colloidal particles having a charged surface without controlling the particle size of colloid.

It should be understood that the example embodiments described therein should be considered in a descriptive sense only and not for purposes of limitation. Descriptions of features or aspects within example embodiments should typically be considered as available for example embodiments not illustrated.

What is claimed is:

1. A method of manufacturing a reflective color filter, the method comprising:
   forming colloidal particles having a charged surface;
   forming colloidal crystals capable of reflecting a first color by controlling distances between the colloidal particles;
   the first color corresponding to one of red, blue and green,
   adding a monomer mixture for photopolymerization to the colloidal crystals capable of reflecting the first color;
   coating the colloidal crystals capable of reflecting the first color and the monomer mixture for photopolymerization on a substrate;
   forming a first photonic crystal composite capable of reflecting the first color by exposing radiation to the colloidal crystals capable of reflecting the first color and the monomer mixture for;
   changing a first portion of the first photonic crystal composite to a second photonic crystal composite capable of reflecting a second color,
   the second color being different than the first color;
   the second color corresponding to a different one of red, blue and green,
   changing one of a second portion of the first photonic crystal composite and a part of the second photonic crystal composite to a third photonic crystal composite that is capable of reflecting a third color,
   the third color being different than the first color and the second color,
   the third color corresponding an other one of red, blue, and green,
   wherein
   the distances between the colloidal particles in at least one of the first photonic crystal composite, the second photonic crystal composite, and the third photonic crystal composite is controlled by expanding the colloidal particles by adding a solvent, or contracting the colloidal particles by evaporating the solvent,
   the forming the first photonic crystal composite includes forming the first photonic crystal composite on first to third pixel regions of the substrate;
   the changing the first portion of the first photonic crystal composite to the second crystal composite includes,
      arranging a first mask over the first photonic crystal composite,
         the first mask defining a first opening over the first portion of the first photonic crystal composite,
         the first portion of the first photonic crystal composite being on the second pixel region and the third pixel region of the substrate, and
         injecting one of a monomer and a solvent into the first portion of the first photonic crystal composite to form the second crystal composite on the second pixel region and the third pixel region of the substrate; and
      the changing the one of the second portion of the first photonic crystal composite and the part of the second photonic crystal composite to the third photonic crystal composite includes changing the part of the second photonic crystal composite to the third photonic crystal composite,
         the part of the second photonic crystal composite being on the third pixel region of the substrate before the changing the part of the second photonic crystal composite to the third photonic crystal composite.

2. The method of claim 1, wherein forming the colloidal particles includes adding a persulfate initiator to a monomer.

3. The method of claim 2, wherein the monomer includes at least one of an acrylate-based monomer, a methacrylate-based monomer, an aromatic monomer, an acrylamide monomer, and an isobutylmethyl acrylamide.

4. The method of claim 2, wherein the persulfate initiator is one of ammonium persulfate ($(NH_4)_2S_2O_8$), potassium persulfate ($K_2S_2O_8$), and sodium persulfate ($Na_2S_2O_8$).

5. The method of claim 2, wherein forming the colloidal particles further includes adding a surfactant to the monomer.

6. The method of claim 5, wherein the surfactant is one of an anionic surfactant, a cationic surfactant, and a zwitterionic surfactant.

7. The method of claim 1, wherein the colloidal crystals capable of reflecting the first color are formed in at least one of a face-centered cubic (FCC) structure, a body-centered cubic (BCC) structure, and a hexagonal close-packed (HCP) structure.

8. The method of claim 7, wherein the colloidal crystals are formed in a hexagonal close-packed (HCP) structure.

9. The method of claim 1, further comprising:
   adding a photo initiator and a cross-linking agent to the colloidal crystals capable of reflecting the first color and the monomer mixture for photopolymerization before the forming the first photonic crystal composite.

10. The method of claim 1, wherein the monomer for photo-polymerization is one of an acrylamide-based monomer and an acrylate-based monomer.

11. The method of claim 10, wherein the acrylate-based monomer is one of ethylene glycol methacrylate, poly(ethylene glycol) methacrylate, hydroxyethyl methacrylate, and butyl methacrylate.

12. The method of claim 9, wherein the cross-linking agent is one of N,N'-methylenebisacrylamide, methylenebismethacrylate, ethyleneglycol dimethacrylate, or poly(ethyleneglycol dimethacrylate).

13. The method of claim 9, wherein the photo initiator is one of 2-hydroxy-2-methylpropiophenone, 2,2-dimethoxy-2-phenylacetophenone, and 2,2-diethoxyacetophenone.

14. A method of manufacturing a reflective color filter, the method comprising:
   forming colloidal particles having a charged surface;
   forming colloidal crystals capable of reflecting a first color by controlling distances between the colloidal particles;
   the first color corresponding to one of red, blue and green,
   adding a monomer mixture for photopolymerization to the colloidal crystals capable of reflecting the first color,
   coating the colloidal crystals capable of reflecting the first color and the monomer mixture for photopolymerization on a substrate;
   forming a first photonic crystal composite capable of reflecting the first color by exposing radiation to the colloidal crystals capable of reflecting the first color and the monomer mixture for;
   changing a first portion of the first photonic crystal composite to a second photonic crystal composite capable of reflecting a second color,
   the second color being different than the first color;
   the second color corresponding to a different one of red, blue and green,
   changing one of a second portion of the first photonic crystal composite and a part of the second photonic crystal composite to a third photonic crystal composite that is capable of reflecting a third color,
   the third color being different than the first color and the second color, the third color corresponding an other one of red, blue, and green, wherein the distances between the colloidal particles in at least one of the first photonic crystal composite, the second photonic crystal composite, and the third photonic crystal composite is controlled by expanding the colloidal particles by adding a solvent, or contracting the colloidal particles by evaporating the solvent, the forming the first photonic crystal composite includes forming the first photonic crystal composite on first to third pixel regions of the substrate;

the changing the first portion of the first photonic crystal composite to the second crystal composite includes,
arranging a first mask over the first photonic crystal composite,
the first mask defining a first opening over the first portion of the first photonic crystal composite,
the first portion of the first photonic crystal composite being on the third pixel region of the substrate, and
exposing the radiation to the first portion of the first photonic crystal composite to form the second crystal composite on the third pixel region of the substrate;

the changing the one of the second portion of the first photonic crystal composite and the part of the second photonic crystal composite to the third photonic crystal composite includes changing the second portion of the first photonic crystal composite to the third photonic crystal composite,
the second portion of the first photonic crystal composite being on the first pixel region of the substrate before the changing the part of the second photonic crystal composite to the third photonic crystal composite.

15. A method of manufacturing a reflective color filter, the method comprising:
forming colloidal particles having a charged surface;
forming colloidal crystals capable of reflecting a first color by controlling distances between the colloidal particles,
the first color corresponding to one of red, blue and green,
adding a monomer mixture for photopolymerization to the colloidal crystals capable of reflecting the first color;
coating the colloidal crystals capable of reflecting the first color and the monomer mixture for photopolymerization on a substrate;
forming a first photonic crystal composite capable of reflecting the first color by exposing radiation to the colloidal crystals capable of reflecting the first color and the monomer mixture for;
changing a first portion of the first photonic crystal composite to a second photonic crystal composite capable of reflecting a second color,
the second color being different than the first color;
the second color corresponding to a different one of red, blue and green,
changing one of a second portion of the first photonic crystal composite and a part of the second photonic crystal composite to a third photonic crystal composite that is capable of reflecting a third color,
the third color being different than the first color and the second color,
the third color corresponding an other one of red, blue, and green, wherein
the distances between the colloidal particles in at least one of the first photonic crystal composite, the second photonic crystal composite, and the third photonic crystal composite is controlled by expanding the colloidal particles by adding a solvent, or contracting the colloidal particles by evaporating the solvent, the forming the first photonic crystal composite includes forming the first photonic crystal composite on first to third pixel regions of the substrate;

the changing the first portion of the first photonic crystal composite to the second crystal composite includes,
arranging a first mask over the first photonic crystal composite,
the first mask defining a first opening over the first portion of the first photonic crystal composite,
the first portion of the first photonic crystal composite being on the first pixel region and the second pixel region of the substrate, and
performing an evaporation process on the first portion of the first photonic crystal composite to form the second crystal composite on the first pixel region and the second pixel region of the substrate;

the changing the one of the second portion of the first photonic crystal composite and the part of the second photonic crystal composite to the third photonic crystal composite includes changing the part of the second photonic crystal composite to the third photonic crystal composite,
the part of the second photonic crystal composite being on the first pixel region of the substrate before the changing the part of the second photonic crystal composite to the third photonic crystal composite.

16. A method of manufacturing a reflective color filter, the method comprising:
forming colloidal particles having a charged surface;
forming colloidal crystals capable of reflecting a first color by controlling distances between the colloidal particles;
the first color corresponding to one of red, blue and green,
adding a monomer mixture for photopolymerization to the colloidal crystals capable of reflecting the first color;
coating the colloidal crystals capable of reflecting the first color and the monomer mixture for photopolymerization on a substrate;
forming a first photonic crystal composite capable of reflecting the first color by exposing radiation to the colloidal crystals capable of reflecting the first color and the monomer mixture for;
changing a first portion of the first photonic crystal composite to a second photonic crystal composite capable of reflecting a second color,
the second color being different than the first color;
the second color corresponding to a different one of red, blue and green,
changing one of a second portion of the first photonic crystal composite and a part of the second photonic crystal composite to a third photonic crystal composite that is capable of reflecting a third color,
the third color being different than the first color and the second color,
the third color corresponding an other one of red, blue, and green,
wherein
the distances between the colloidal particles in at least one of the first photonic crystal composite, the second photonic crystal composite, and the third photonic crystal composite is controlled by expanding the colloidal particles by adding a solvent, or contracting the colloidal particles by evaporating the solvent, the forming the first photonic crystal composite includes forming the first photonic crystal composite on first to third pixel regions of the substrate;

the changing the first portion of the first photonic crystal composite to the second crystal composite includes, arranging a first mask over the first photonic crystal composite,
the first mask defining a first opening over the first portion of the first photonic crystal composite,
the first portion of the first photonic crystal composite being on the second pixel region of the substrate, and
performing an evaporation process on the first portion of the first photonic crystal composite to form the second crystal composite on the second pixel region of the substrate;
the changing the one of the second portion of the first photonic crystal composite and the part of the second photonic crystal composite to the third photonic crystal composite includes changing the second portion of the first photonic crystal composite to the third photonic crystal composite,
the second portion of the first photonic crystal composite being on the first pixel region of the substrate before the changing the second portion of the first photonic crystal composite to the third photonic crystal composite.

* * * * *